D. C. JACKSON.
MERCURY METER.
APPLICATION FILED AUG. 5, 1907.

1,049,365.

Patented Jan. 7, 1913.

Witnesses:
Leonard W. Novander.
Charles J. Schmidt.

Inventor
Dugald C. Jackson
By Charles A. Brown,
Attorney

UNITED STATES PATENT OFFICE.

DUGALD C. JACKSON, OF BOSTON, MASSACHUSETTS.

MERCURY-METER.

1,049,365.  Specification of Letters Patent.  Patented Jan. 7, 1913.

Application filed August 5, 1907. Serial No. 387,019.

*To all whom it may concern:*

Be it known that I, DUGALD C. JACKSON, citizen of the United States, residing at Boston, in the county of Suffolk and State of Massachusetts, have invented a certain new and useful Improvement in Mercury-Meters, of which the following is a full, clear, concise, and exact description, reference being had to the accompanying drawings, forming a part of this specification.

My invention relates to wattmeters, particularly to mercury wattmeters, its object being to produce a meter of this kind which will accurately and efficiently register watts when used with alternating current circuits.

When a mercury wattmeter is used for measuring alternating current, many conditions must be compensated and adjusted for, as for instance, frequency conditions or phase relations. To be commercially successful the meter must be constructed to automatically compensate and adjust for frequency changes and must automatically take care of the phase relationships and variations. Friction and its varying value must also be adjusted for. The meter must be adapted to meet all the varying conditions so that it can be accurate in its registration throughout a wide range of such variations of conditions. The mechanical construction and arrangement of the various meter parts play a very important part in the accomplishment of accurate registration through a wide range, the desire being also that the physical meter be not too bulky or of too much weight, but should be comparatively small and compact, as light as possible and neat in appearance, and the object of my invention is to accomplish all these desired features of operation and construction.

My invention will be better understood if described in connection with the accompanying drawings which represent one embodiment of the invention and in which—

Figure 1:
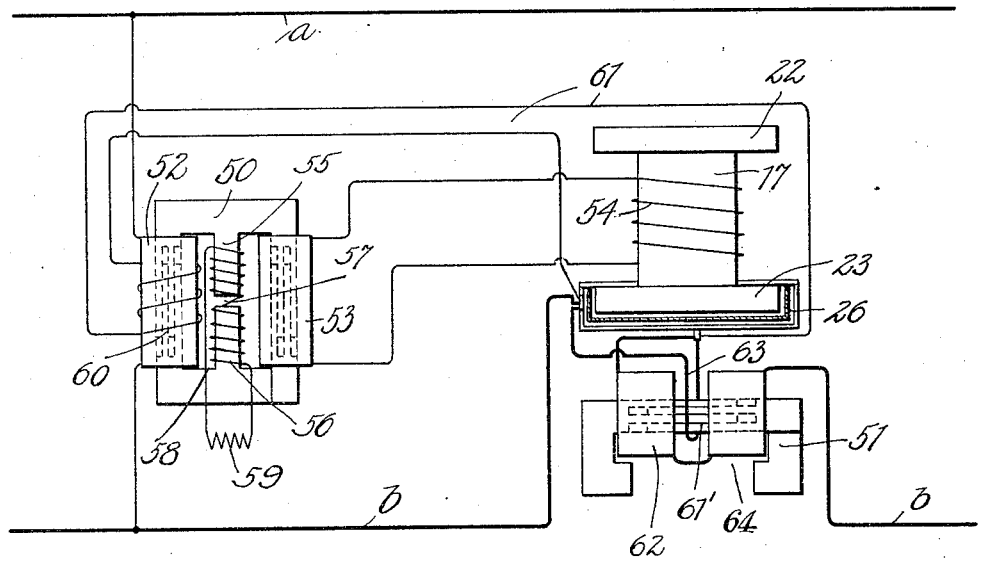
Figure 2:
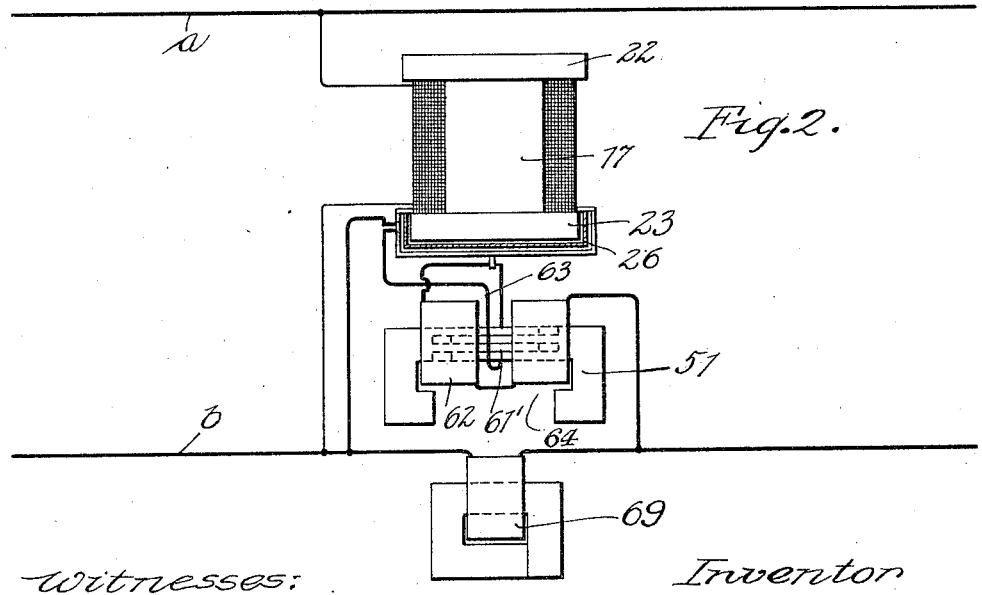

Figure 1 is a diagrammatic view, showing the arrangement of the various compensating and adjusting devices of the meter; Fig. 2 is a diagrammatic view, showing a modification in the arrangement of the compensating and adjusting devices.

The width of the mercury chamber should be as small as possible, but it should be of sufficient width to allow for reasonable mechanical clearance and to prevent undue friction of the mercury. To attain the best results, the edges of the magnetic plates should be clear of insulating material, the object being to have the magnetic gap as small as possible so as to get the magnetism through the armature with the least expenditure of energy. The armature is given the cup-shape shown in order to provide for greater surface for the magnetic flux to pass through without increasing the diameter of the armature.

Fig. 1 shows the circuit arrangements for the meter and its connection with the circuit whose wattage is to be measured. The magnetic core 17 of the potential winding of the meter is surrounded by a magnetic frame 16, so conformed that its lower portion constitutes a cup for containing mercury in which the armature 26 is rotatably supported. The compensating and adjusting mechanisms are here shown more or less diagrammatically and comprise a pressure transformer 50 and a series transformer 51. The primary winding 52 of the pressure transformer is connected across the limbs $a$, $b$, of the circuit to be measured, while the secondary winding 53 is connected in circuit with the energizing winding 54 surrounding the magnetic core of the meter. This transformer changes the line pressure to a suitable voltage for operating the meter, and the transformer is also arranged to compensate for changes in frequency. This compensation is obtained by means of the tongues 55, 56, which form a leakage path between the primary and secondary magnetic circuits of the transformer, these tongues being separated by the air gap 57. The tongues are also surrounded by the winding 58 which may be short-circuited or which may include in circuit the extra resistance 59. The transformer core is built up of laminations which are preferably so arranged that the air gap 57 may conveniently be varied in order to adjust for the proper compensation effect, as shown in Figs. 1 and 2. By getting the correct relation between the length of the air gap and the number of turns and resistance of the compensating winding 58, compensation for frequency is obtained by the least expenditure of energy. The effect of friction is compensated for by means of current from a winding 60 affected by the magnetic circuit of the primary of the transformer. The circuit 61 including this winding also serially includes the meter armature, as shown, one terminal of the circuit connecting with the outer electrodes and the other terminal connecting with the central electrode.

The series transformer 51 comprises the core 61' on which are the windings 62, these windings and the armature being included serially in the line limb $b$, the circuit being from the line limb $b$ to the outer electrodes, through the mercury chamber and armature to the central electrode, then through the windings 62 and back to the line limb $b$. The secondary 63 of the transformer 51 is a very low pressure, low resistance winding and may be a single loop of copper. One terminal of this secondary winding connects with the outer electrodes and the other terminal connects with the central electrode, the secondary current, therefore, also passing through the mercury chamber and armature. The laminations of the core 61' are such as will produce an air gap 64, and these laminations are preferably arranged so as to be adjustable whereby the length of the air gap may be varied. The current from the transformer is combined with that of the line so as to give a resultant current through the armature which is in phase with the magnetism passing through the armature when the load is without reactance, this being a condition for the accurate and satisfactory operation of the meter. The transformers are supported in any convenient position within the meter frame.

The operation of the meter and the compensating, adjusting mechanisms is as follows: The conjoint effect of the magnetic flow transversely through the armature, and the current flow radially through the mercury and armature is to cause rotation of the armature and of the indicating mechanism connected therewith. When the meter is used on alternating current, the compensating devices are necessary, and with standard frequency a definite amount of flux will pass through the magnetic circuit of the pressure transformer 50 and a definite part of this magnetic flow goes through the leakage path and air gap. If the frequency of the circuit rises, there is a tendency for the meter to take less exciting current on account of the changes in the inductive conditions, and the meter thus tends to run slower. When the frequency rises, the amount of flux through the transformer diminishes, but the short-circuited winding is constant in its effect and chokes back the same amount of flux during any frequency, so that the secondary of the transformer will get more than its proportionate share of the flux than it would with the lower frequency, and the pressure at the terminals of the secondary winding and consequently the pressure of the energizing meter winding rises, and if the compensating transformer is properly adjusted, the meter speed will not be affected. If the frequency on the other hand, should be diminished, the secondary terminal pressure will correspondingly diminish. By proper adjustment, therefore, of the pressure transformer, the change of pressure of the secondary winding is made to overcome the normal change in exciting current of the meter with change of frequency, and the speed of the meter remains constant for uniform loads.

To cause the meter to register properly under varying conditions of pressure of the main circuit, the magnetic circuits of the meter should be designed so that for increase or decrease of pressure across the circuit, the magnetism passing through the armature will increase or decrease so as to keep the meter operating at its correct constant, namely, $$\frac{\text{Watts measured}}{\text{Revolutions per minute}},$$

whether the pressure remains constant or varies between reasonable limits. This is done by having the magnetic densities in the pressure transformer and the meter so that they will be on the portions of the magnetization curve which will give this desired variation of flux through the armature.

Another method for obtaining frequency compensation is illustrated in Fig. 2, in which an inductance coil 69 is associated with the primary of the series transformer 51, being shown as connected in bridge of the primary of the transformer together with the meter armature. With this arrangement when the frequency rises, the inductance of 69 permits less current to pass through the coil, thus sending more current through the armature, and when the frequency falls, the inductance permits more current to pass through it and thus withdraws current from the armature. Additional current is thus furnished the armature when the magnetism decreases owing to frequency change and less current is available for the armature when the magnetism increases owing to frequency change, and by correctly proportioning the inductance, it can be made to compensate correctly for any frequency error.

Many other changes and variations may be made in the construction and arrangement of the meter parts and circuits without departing from the scope of the invention, and I should not be limited to the particular arrangements shown and described.

I desire to secure the following claims by Letters Patent:

1. In a mercury meter, the combination of a magnetic frame providing a mercury chamber, an armature pivoted to be rotatable within said chamber, a magnetizing winding for the magnetic frame, a transformer having a winding connected with the magnetizing winding and having another winding adapted for connection with the alternating current circuit to be measured, said transformer having devices compensating for frequency changes.

2. In a mercury meter, the combination of a magnetic frame providing a mercury chamber, an armature pivoted to be rotatable within said chamber, a magnetizing winding for the magnetic frame, a transformer having a winding connected with the magnetizing winding and another winding adapted for connection with the circuit to be measured, a magnetic leakage path for the transformer, and a closed circuit winding on said leakage path, said closed circuit winding and said leakage path affording means for adjusting and compensating for frequency changes.

3. In an alternating current mercury meter, the combination of a magnetic frame providing a mercury chamber, an armature pivoted to be rotated within said chamber, a magnetizing winding for the magnetic frame, a transformer having a winding connected with the magnetizing winding and having another winding adapted for connection with the circuit to be measured, a magnetic leakage path for the transformer having an adjusted air gap, and an auxiliary winding for the magnetic leakage path, said leakage path, air gap and auxiliary winding affording a means for adjusting for frequency variation.

4. In an alternating current mercury wattmeter, the combination of a magnetic frame providing a mercury chamber, an armature adapted to rotate within the chamber, a magnetizing winding for the magnetic frame, a pressure transformer having a winding adapted for connection with the circuit to be measured and a secondary winding connected with the magnetizing winding, a magnetic leakage path for the transformer having an adjustable air gap and a short circuited auxiliary winding for said leakage path, said leakage path, air gap and short circuited winding coöperating with the magnetic flow of the transformer to cause the current flow through the secondary winding which will produce a magnetic flow through the armature proportional to the pressure of the circuit to be measured, and means for causing current flow through the armature proportional to the current flow through the main circuit.

5. In an alternating current mercury wattmeter, the combination of a magnetic frame providing a mercury chamber, an armature adapted to rotate within the chamber, a magnetizing winding for the magnetic frame, a pressure transformer having a winding adapted for connection with the circuit to be measured and a secondary winding connected with the magnetizing winding, a magnetic leakage path for the transformer having an adjustable air gap, a short-circuited auxiliary winding for said leakage path, said leakage path, air gap and short-circuited winding coöperating with the magnetic flow of the transformer to cause current flow through the secondary winding which will produce a magnetic flow through the armature proportional to the pressure of the circuit to be measured, and means for causing current flow through the armature proportional to the current flow through the main circuit.

6. In an alternating current mercury wattmeter, the combination of a magnetic frame providing a mercury chamber, an armature adapted to rotate within the chamber, a magnetizing winding for the magnetic frame, a pressure transformer having a winding adapted for connection with the circuit to be measured and a secondary winding connected with the magnetizing winding, a magnetic leakage path for the transformer having an adjustable air gap, a short-circuited auxiliary winding for said leakage path, said leakage path, air gap and short-circuited winding coöperating with the magnetic flow of the transformer to cause current flow through the secondary winding which will produce a magnetic flow through the armature proportional to the pressure of the circuit to be measured, and a series transformer included in the main circuit, the windings of said series transformer being associated with the armature to cause current flow therethrough proportional to the current flow through the main circuit.

7. In an alternating current mercury wattmeter, the combination of a magnetic frame providing a mercury chamber, an armature adapted to rotate within the chamber, a magnetizing winding for the magnetic frame, a pressure transformer having a winding adapted for connection with the circuit to be measured and a secondary winding connected with the magnetizing winding, a magnetic leakage path for the transformer having an adjustable air gap, a short-circuited auxiliary winding for said leakage path, said leakage path, air gap and short-circuited winding coöperating with the magnetic flow of the transformer to cause current flow through the secondary winding which will produce a magnetic flow through the armature proportional to the pressure of the circuit to be measured, means for causing current flow through the armature proportional to the current flow through the main circuit, and friction compensating means comprising a circuit which serially includes the armature and by induction receives current from the pressure transformer.

8. In a mercury meter, the combination of a magnetic frame providing a mercury chamber, an armature adapted to rotate within the chamber, a magnetizing winding for the magnetic frame, a pressure transformer for supplying current to the magnetizing winding, a local circuit receiving current by induction from the pressure transformer and serially including the armature to compensate for friction variation in the armature, and means for causing through the armature a current flow proportional to the current flowing through the main circuit with which the meter is connected.

9. In an alternating current mercury wattmeter, the combination of a magnetic frame providing a mercury chamber, an armature pivoted to rotate within said chamber, a magnetizing winding for the magnetic frame, means for causing current flow through the magnetizing winding proportional to the pressure in the circuit with which the meter is connected, a series transformer, a primary winding for said series transformer included serially in the main circuit with the armature, and a secondary winding upon the same core as the primary winding and connected in bridge of the armature, said transformer having an adjusted air gap whereby to bring the phase of the current through the armature and the phase of the magnetic flow through the armature into the same relation as the current and pressure of the main circuit.

10. In an alternating current mercury watt meter, the combination of a magnetic frame providing a mercury chamber, an armature pivoted to rotate within said chamber, means for causing a magnetic flow through the magnetic frame and armature proportional to the pressure of the circuit with which the meter is connected, a transformer, a primary winding for the transformer connected serially in the main circuit with the armature, a secondary winding for the transformer bridged about the armature, means providing compensating current flow through the armature to compensate for friction variation, and means for maintaining practically constant the effective magnetic flow through the magnetic frame for variations in frequency of the current measured.

11. In a mercury wattmeter, the combination of an armature, a magnetic frame providing a mercury chamber for the armature and adapted for generating magnetic flux through the armature, a magnetizing winding for energizing the magnetic frame, a transformer having a primary winding adapted for connection with a constant potential circuit, said transformer having one secondary winding arranged to furnish current to the armature at a pressure independent of the frequency but dependent upon the pressure applied to the primary winding, another secondary winding for the transformer arranged to furnish current to the magnetizing winding at a pressure dependent upon the frequency, and means for causing current flow through the armature proportional to the current flow through the constant potential circuit.

12. In an alternating current wattmeter, the combination of an armature adapted to rotate, a magnetic frame for causing magnetic flux through the armature, a magnetizing winding for the magnetic frame, a pressure transformer having a primary winding adapted for connection with the alternating current circuit to be measured and having a secondary winding connected with the magnetizing winding, a second secondary winding for the transformer for supplying current flow through the armature, and means for causing current flow through the armature proportional to the current flow through the main circuit to be measured.

13. In an alternating current wattmeter, the combination of an armature, a field frame for the armature, means for causing energization of the field frame and magnetic flux proportional to the pressure of an alternating current main circuit, a transformer having a primary winding included in the main circuit, said main circuit also including the armature, and a secondary winding upon the same core as the primary winding paralleled with a portion of the main circuit including the armature.

14. In an alternating current wattmeter, the combination of an armature and a field winding, a transformer having a winding included in the main circuit, said main circuit also including one circuit of the meter, and a second winding upon the same core as the primary winding paralleled with a portion of the main circuit including the armature.

15. An alternating current meter with a field winding and an armature, a transformer, a primary winding, two secondary windings, means for causing one of said secondary windings to furnish current at a pressure independent of the frequency but dependent on the pressure applied to the primary winding and for causing the other secondary winding to furnish current dependent upon the frequency, and electrical connections from said secondary windings to the circuits of the meter.

16. In an alternating current watt meter, the combination of an armature, means for causing a magnetic flow through the armature proportional to the pressure of the circuit with which the meter is connected, and inductance means for maintaining a substantially constant effective magnetic flow through the armature for variations in frequency of the current measured.

17. In an alternating current watt meter, the combination of an armature, inductance means for maintaining a substantially constant effective magnetic field through the armature for variations in frequency of the current measured, and inductance means for establishing a current flow through the armature in phase with the magnetic field thus produced.

In witness whereof, I hereunto subscribe my name this 20th day of July A. D., 1907.

DUGALD C. JACKSON.

Witnesses:
CARRIE M. BARNES,
MABEL F. JACKSON.

Copies of this patent may be obtained for five cents each, by addressing the "Commissioner of Patents, Washington, D. C."